United States Patent
Curtis et al.

(10) Patent No.: US 6,650,533 B2
(45) Date of Patent: *Nov. 18, 2003

(54) PLUGGABLE DRIVE CARRIER ASSEMBLY

(75) Inventors: Robert B. Curtis, Palo Alto, CA (US); Bryan T. Silbermann, Saratoga, CA (US); Robert W. Horst, Saratoga, CA (US)

(73) Assignee: 3ware, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/184,099

(22) Filed: Jun. 25, 2002

(65) Prior Publication Data

US 2003/0011981 A1 Jan. 16, 2003

Related U.S. Application Data

(63) Continuation of application No. 09/693,259, filed on Oct. 20, 2000, now Pat. No. 6,424,523.
(60) Provisional application No. 60/224,665, filed on Aug. 11, 2000.

(51) Int. Cl.[7] .................................................. G06F 1/16
(52) U.S. Cl. ....................... 361/685; 361/798; 361/801; 312/331; 439/157
(58) Field of Search ................................. 361/683, 684, 361/685, 686, 724–727, 732, 740, 754, 755, 759, 798, 801; 312/223.2, 244, 331, 331.1, 334.23; 439/60, 152, 153, 157, 327–328, 331, 345, 304, 928.1

(56) References Cited

U.S. PATENT DOCUMENTS

| | | | |
|---|---|---|---|
| 5,212,681 A | 5/1993 | Bock et al. | 369/244 |
| 5,539,616 A * | 7/1996 | Kikinis | 361/686 |
| 5,579,204 A | 11/1996 | Nelson et al. | 361/685 |
| 5,652,697 A | 7/1997 | Le | 361/788 |
| 5,682,277 A | 10/1997 | Hanson | 360/97.01 |
| 5,790,374 A | 8/1998 | Wong | 361/685 |
| 6,018,456 A | 1/2000 | Young et al. | 361/684 |
| 6,231,224 B1 | 5/2001 | Gamble et al. | 362/551 |
| 6,247,944 B1 | 6/2001 | Bolognia et al. | 439/157 |
| 6,249,432 B1 | 6/2001 | Gamble et al. | 361/685 |
| 6,424,523 B1 * | 7/2002 | Curtis et al. | 361/685 |

FOREIGN PATENT DOCUMENTS

| | | |
|---|---|---|
| DE | 200 18 126 U1 | 2/2001 |
| EP | 0 442 642 A2 | 8/1991 |
| EP | 0 602 255 A1 | 6/1994 |
| WO | WO 98/18129 | 4/1998 |
| WO | WO 99/60832 | 11/1999 |

OTHER PUBLICATIONS

PCT International Search Report, 7 pages.

* cited by examiner

Primary Examiner—Darren Schuberg
Assistant Examiner—Hung Van Duong
(74) Attorney, Agent, or Firm—Knobbe, Martens, Olson & Bear LLP

(57) ABSTRACT

A computer system with a pluggable drive carrier assembly comprises a cabinet and a circuit board disposed within the cabinet. The circuit board, such as a base board, has a number of connectors attached to a first surface. A drive unit such as a hard disk drive is secured within a carrier. A logic connector and a power connector are adapted to attach to the drive. A flexible circuit assembly connects the logic connector and the power connector to a blind plug. The blind plug is adapted to mate with any of the number of connectors. A cam surface and lever arrangement is used to urge into engagement the blind plug and the selected one of the number of connectors. The logic connector and the power connector both have a number of contacts that extend in a direction generally parallel to the first surface of the circuit board such that a backplane is not required and can be eliminated.

20 Claims, 7 Drawing Sheets

PLUGGABLE DRIVE CARRIER ASSEMBLY

RELATED APPLICATIONS

This application is a continuation of U.S. patent application Ser. No. 09/693,259, which was filed on Oct. 20, 2000 and which issued as U.S. Pat. No. 6,424,523 on Jul. 23, 2002. The priority of U.S. Provisional Application No. 60/224,665, filed Aug. 11, 2000, which was copending with the parent application, also is hereby claimed. In addition, the disclosure of that provisional application is hereby expressly incorporated by reference.

BACKGROUND OF THE INVENTION

1. Field of the Invention

The present invention generally relates to peripheral computing devices such as disk drives, and more particularly to pluggable drive carrier assemblies.

2. Description of Related Art

Modern computers often include one or more peripheral devices such as hard-disk drives, CD-ROM drives, and DVD drives. These devices typically include motors and mechanisms for spinning the storage media and for moving read heads or read/write heads, and also include circuitry for controlling mechanical movement as well as the transfer of data. As the cost of nonvolatile, solid state memories decreases, it is also becoming feasible to use solid state drives that have no moving parts. These solid state drives may use the same form factors and storage protocols as conventional drives to facilitate substitution.

For many applications, it is desirable to be able to insert or remove a drive while the computer system is operating. For example, computer networks commonly include servers that include arrays of hot-pluggable disk drives. These disk arrays are typically configured according to a RAID (Redundant Array of Inexpensive Disks) configuration in which a malfunctioning drive can be replaced without bringing the disk array off-line, and without causing any loss of data.

In RAID and other disk array subsystems, the drives are commonly mounted on separate trays or carriers and inserted side-by-side into a cavity defined within a computer housing or cabinet. An internal sheet metal chassis of the computer defines or receives guides for aligning connectors on the drives with mating connectors on a rigid backplane. In such systems, the backplane defines an inner wall of the cavity and provides electrical interconnections to and from the mating connectors. Holes often are provided through the backplane to accommodate a cooling airflow through the cavity. In some arrangements the backplane is passive (i.e., does not provide electrical connections) while in other arrangements the backplane contains electrical connectors or components for communicating with the disk drives.

Typically, a computer system having a RAID-type subsystem has a so-called tower configuration wherein the computer system is taller than it is wide, as opposed to a desktop configuration wherein the computer system is wider than it is tall. The individual drives are typically mounted in the computer system such that each drive can be extracted and inserted through the front of the computer system cabinet. In order to accommodate this feature, the backplane for the RAID-type subsystem is mounted with the backplane perpendicular to the sidewalls of the computer system. The sides of the cabinet, the front of the cabinet and the backplane together define a drive cage.

The traditional construction, however, is complex and bulky. The backplane is connected to further circuit boards and controllers through cabling. In addition, the perpendicular backplane occupies additional space relative to the further circuit boards and controllers. Moreover, due to the fixed nature of the backplane relative to the cabinet and the fixed nature of the storage units relative to the cabinet, the proper mating of the backplane and the storage units requires rather precise positioning of the two relative to one another. This proper mating is further complicated by the lack of conformity from storage unit type to storage unit type that result in differing connectors and connector locations.

SUMMARY OF THE PRESENT INVENTION

One aspect of the present invention involves a pluggable drive carrier for drives. The carrier comprises a flex circuit with single-sided mounting of a plurality of connectors. The plurality of connectors comprises a blind connector and a second connector. The blind connector is adapted to couple with a right angle docking connector attached to a base board. The flex circuit is folded such that said second connector extends in a first direction and said blind connector extends in a second direction that is opposite of said first direction.

Another aspect of the present invention involves a computer system comprising a circuit board and a first connector mounted to said circuit board. A drive is secured to a carrier and has a drive connector disposed on a surface. The circuit board extends in a direction generally normal to said surface. The carrier comprises a flexible circuit and said flexible circuit comprises a mating connector and a blind-plug. The mating connector is adapted to connect to said drive connector and said blind-plug is adapted to couple to said first connector.

A further aspect of the present invention involves an electronic system comprising an enclosure and a base board positioned within said enclosure. The base board comprises a docking connector that is fixed to a surface of said base board. A drive carrier is adapted for insertion into said enclosure along a first axis. A drive is disposed within said drive carrier and has a connector disposed along a first surface. The first axis extends in a direction generally parallel to said base board and a flexible circuit extends between said connector of said drive and said docking connector of said base board.

Another aspect of the present invention involves a pluggable drive carrier. The carrier comprises a carrier body adapted to receive a drive and has an outside surface. A blind plug connector is mounted to said outside surface and a flexible circuit is connected to said outside surface. The flexible circuit is electrically coupled to said blind plug connector. A second connector is secured to said flexible circuit and said second connector is capable of being disposed within said carrier body.

Yet another aspect of the present invention involves an electronic system comprising an enclosure having an opening. An insertion passage is defined within said enclosure and has one end terminating at said opening. The insertion passage defines an insertion axis. A carrier is capable of insertion into said opening along said insertion passage. A base board is disposed within said enclosure with a connector mounted to said base board. A cooperating blind connector is disposed on said carrier and said baseboard is positioned parallel to said insertion axis.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF A PREFERRED EMBODIMENT

Figure 1:
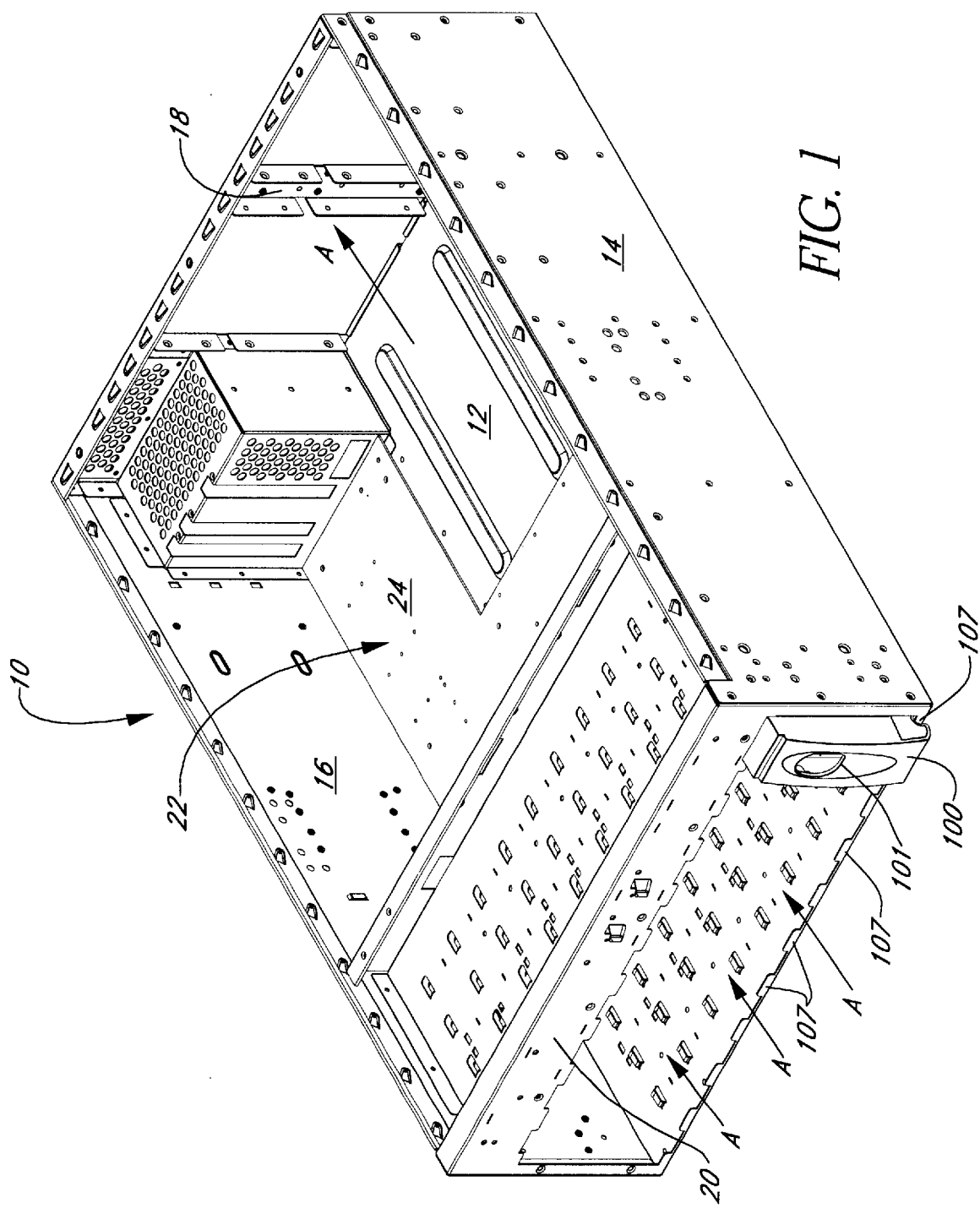
FIG. 1 is a top-front perspective view of a cabinet with a carrier installed, the carrier is configured and arranged in accordance with certain features, aspects and advantages of the present invention.
Figure 2:
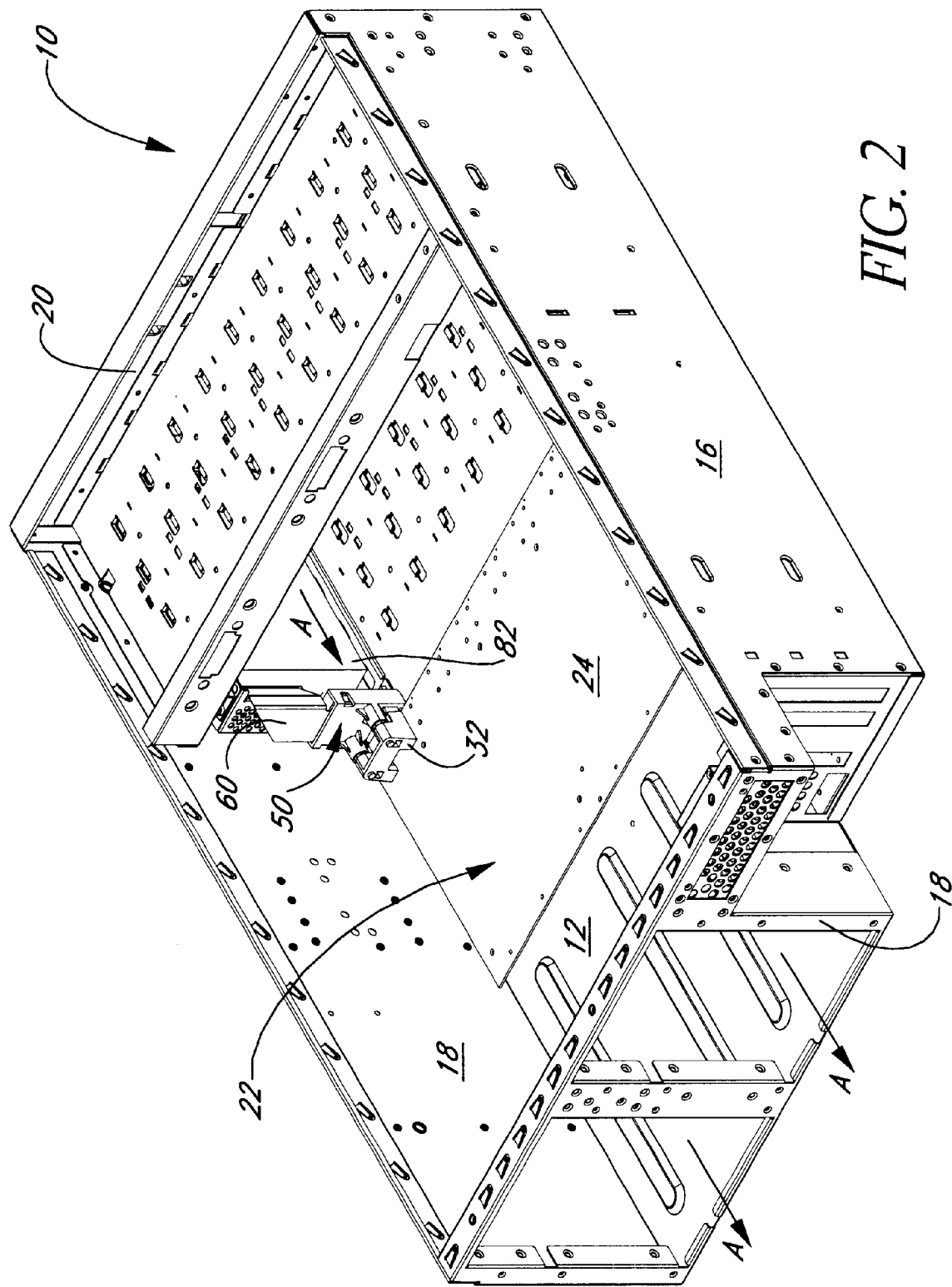
FIG. 2 is a top-rear perspective view of the cabinet and carrier of FIG. 1.

With initial reference to FIGS. 1 and 2, a cabinet 10 for a computer system is illustrated therein. The cabinet 10 can be any type of box, frame or enclosure suitable for housing computer components, including storage drives such as hard disk drives, optical drives, tape back-up drives, and solid state drives. The cabinet 10 has been illustrated without the aesthetic covers normally associated with such cabinets. Of course, the cabinet can also comprise such covers. The computer system may, for example, be a network-attached storage server system which includes an array of hot pluggable disk drives In the illustrated arrangement, the cabinet 10 comprises a bottom wall 12, a first side wall 14, a second side wall 16, a rear wall 18 and a front wall 20. Additionally, the illustrated cabinet 10 comprises a number of internal walls that define a number of rooms or chambers within the cabinet 10. All of these walls in the illustrated arrangement include a number of holes, apertures, protrusions, recesses and other constructions used to mount, secure, affix, or orient a number of components that will complete the computer system.

A base board 22, which functions in some respects similar to a backplane, is placed within the cabinet such that air flows over the larger upper surface 24 of the base board 22. Preferably, the base board 22 is spaced from the bottom wall 12 in any suitable manner. Such spacing facilitates a cooling airflow A over the larger bottom surface of the base board 22 as well. In other words, the base board 22 generally comprises a top surface 24 and a bottom surface that are spaced from each other by very small side surfaces and the air flow through the cabinet 10 generally is parallel to the top surface 24 and the bottom surface. Such a cooling airflow A is facilitated by the lack of an enlarged perpendicular back plane that extends across the cabinet 10 and that obstructs the airflow through the cabinet 10.

A number of right angle docking connectors 26 are disposed along the base board 22. In one arrangement, eight docking connectors 26 are used. In other arrangements, such as those useful in lower cost systems, less than eight docking connectors 26 can be provided. In yet other, high cost, high performance systems, more than eight docking connectors 26 can be provided.

The width of the illustrated docking connector 26 preferably is sized for optimal placement. As will be explained, a carrier 28 docks to the docking connector 26 in a manner that will also be explained. Accordingly, optimizing placement of the docking connectors 26 takes into consideration the minimal spacing between adjacent carriers 28 such that each carrier 28 can be minimally spaced from the next carrier 28 (i.e., minimal pitch). In one arrangement, the connector has a width of approximately 30 mm. Of course, the width can be varied depending upon the application or the components being connected.

The docking connectors 26 generally comprise a number of contacts (i.e., 60 in some applications). Preferably, there are sufficient contacts to provide a signal conductor, a signal-ground conductor, a power conductor, and a power-ground conductor. These contact and conductor combinations can be used to establish an electrical communication between the base board 22 and a particular type of peripheral device, such as a hard drive. The drive may, for example, be an ATA (Advanced Technology Attachment) or a SCSI (Small Computer System Interface) drive.

In addition, one aspect of the present invention results from the unique construction of the docking connectors 26. More particularly, the docking connectors have an input end that extends in a direction that is not parallel, or otherwise collinear with the output end. In the illustrated arrangement, for instance, the input end (i.e., the open end prior to connection with a drive) extends in a direction that is generally 90 degrees from the output end (i.e., the end mating with the base board 22). This arrangement facilitates connection of several drives to the base board 22 without the use of a backplane that extends generally normal to the illustrated base board 22 and that spans the width and height of the cabinet 10. It is anticipated that the docking connectors 26 can turn the leads from the input end to the output end varying amounts; however, the generally right angle bend shown in the illustrated arrangement advantageously results in improved mating between the docking connector 26 and a flexible circuit assembly 30 and in improved airflow patterns through the cabinet 10.

Figure 3:
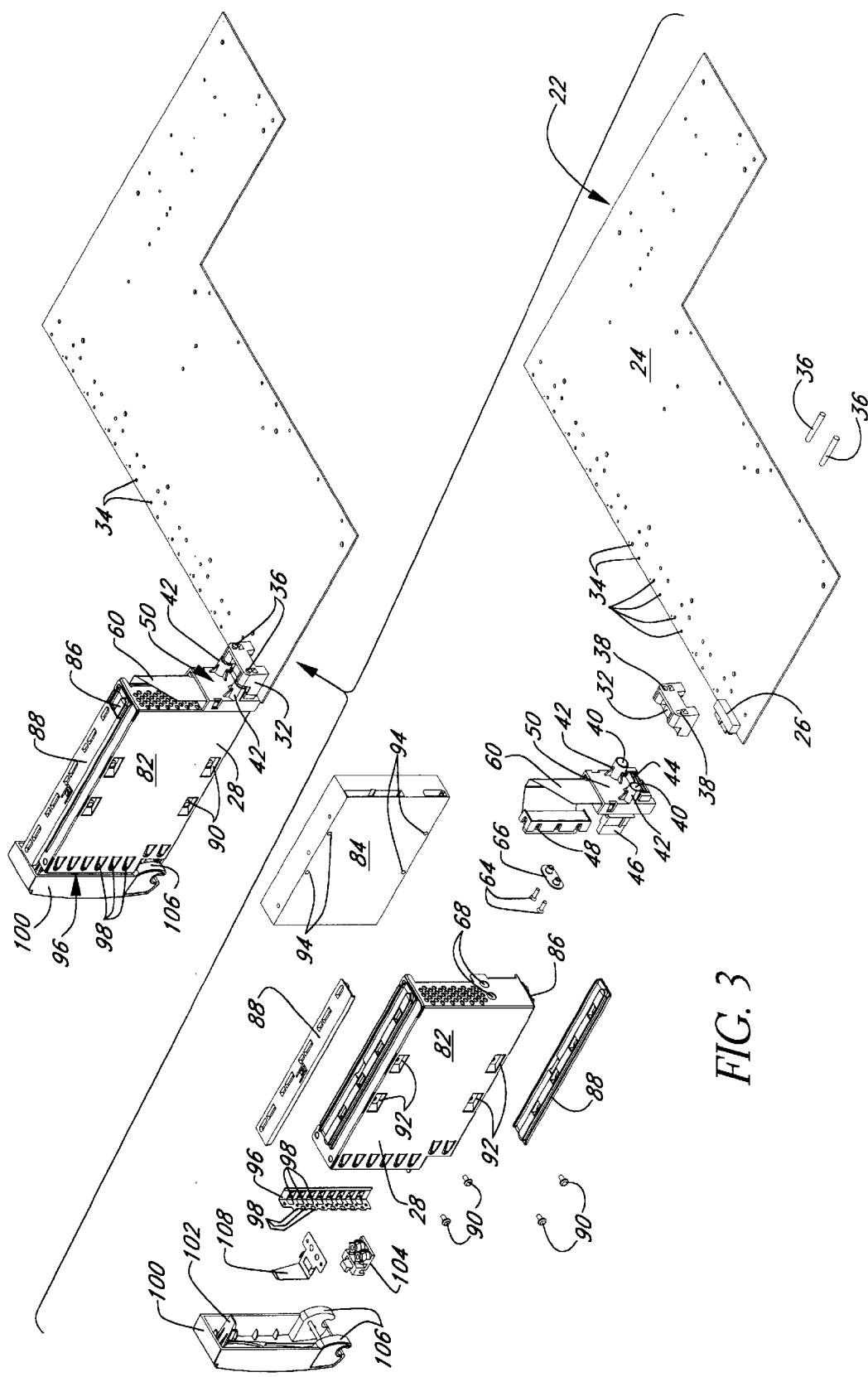
FIG. 3 is a top-rear perspective view of several components relating to the carrier and the carrier mounting arrangement shown in an exploded format to illustrate the separate components.

A guide pin block 32 is used to secure each docking connector 26 of the illustrated arrangement to a desired location on the base board 22. The guide pin block 32 preferably is injection molded of a suitable plastic. The guide pin block 32 desirably is sized and configured to receive the docking connector 26 as best illustrated in FIG. 3. In the illustrated arrangement, the guide pin block 32 includes a recess (not shown) that substantially encases and captures the docking connector 26.

The illustrated guide pin block 32 also includes holes (not shown) that receive threaded fasteners (also not shown). In addition, the base board 22 preferably includes complementary holes 34 to receive the same threaded fasteners (not shown). The threaded fasteners (not shown) secure the guide pin block 32 and the entrapped docking connector 26 along an edge of the top surface 24 of the base board 22. Each docking connector 26, thus, can be secured to the base board 22. Of course, other mounting arrangements, such as clips, clamps, pins, rings, or the like also can be used.

The illustrated guide pin block 32 contains at least one, but preferably more than one, alignment mechanism 36. The alignment mechanism 36 cooperates between the guide pin block 32 and the flexible circuit assembly 30. In the illustrated arrangement, the alignment mechanism 36 comprises a pair of tapered dowel pins 36. The dowel pins 36 are tapered for a reason that will become apparent. The dowel pins 36 preferably are press fit into at least one of the guide pin block 32 and the flexible circuit assembly 30. In the illustrated arrangement, the dowel pins 36 are press fit into holes 38 formed the guide pin block 32. As will be explained, the dowel pins 36 are adapted to be received within a pair of holes 40 in the flexible circuit assembly 30.

While the dowel pins 36 preferably are tapered or stepped, it is anticipated that straight pins and stepped or tapered holes can be used. The tapering or stepping of at least one of the dowel pins and the holes allows the two components, the flexible circuit assembly 30 and the guide pin block 32, to be slightly misaligned before coupling and then facilitates alignment of the two components 30, 32 as the pins 36 move deeper within the holes 40. Of course, it is also contemplated that the holes can be disposed within conical shaped bosses 42 formed within a component of the flexible circuit assembly 30.

The flexible circuit assembly 30 generally comprises a vertical docking connector 44, an industry standard matching hard drive power connector 46 and an industry standard matching hard drive signal connector 48. At this point, it bears mentioning that up and down, right and left, and other directional identifiers are relative to the illustrated drawing but have little significance in the orientation of the assembled product. In addition, while the docking connector 44 is described as a vertical docking connector, it should be apparent from the figures that the illustrated arrangement is shown horizontal. From this information, it should be understood that, as indicated above, the illustrated construction of the preferred arrangement is a tower having the drives disposed in carriers 28 that extend generally horizontal when installed. It is anticipated, however, that the same construction can be used for drives that are disposed in carriers 28 that extend generally vertical when installed.

Figure 4:
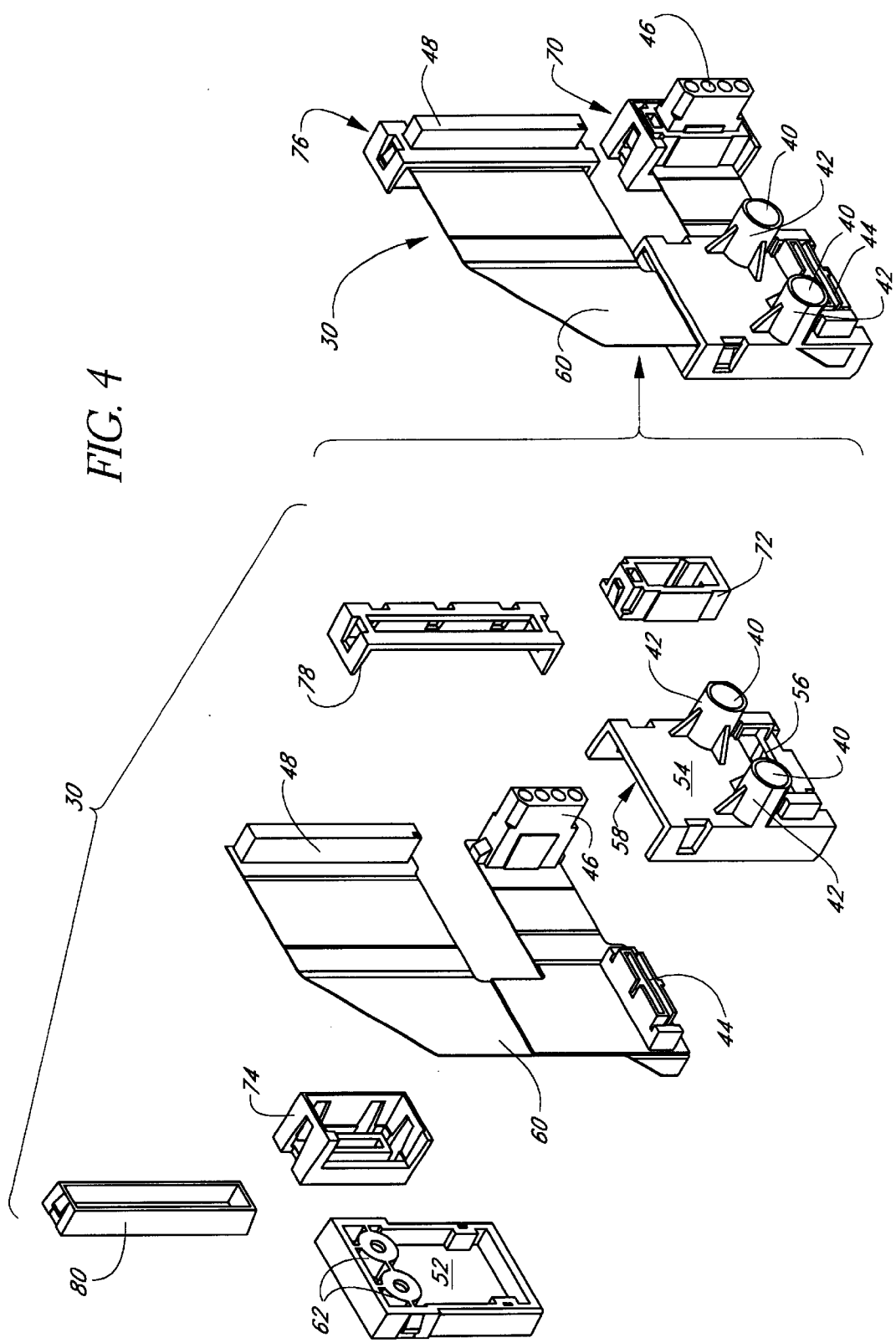
FIG. 4 is a top-rear perspective view of several components that form a docking clamp that is configured and arranged in accordance with certain features, aspects and advantages of the present invention, the components are shown in an exploded format to illustrate the separate components.
Figure 5:
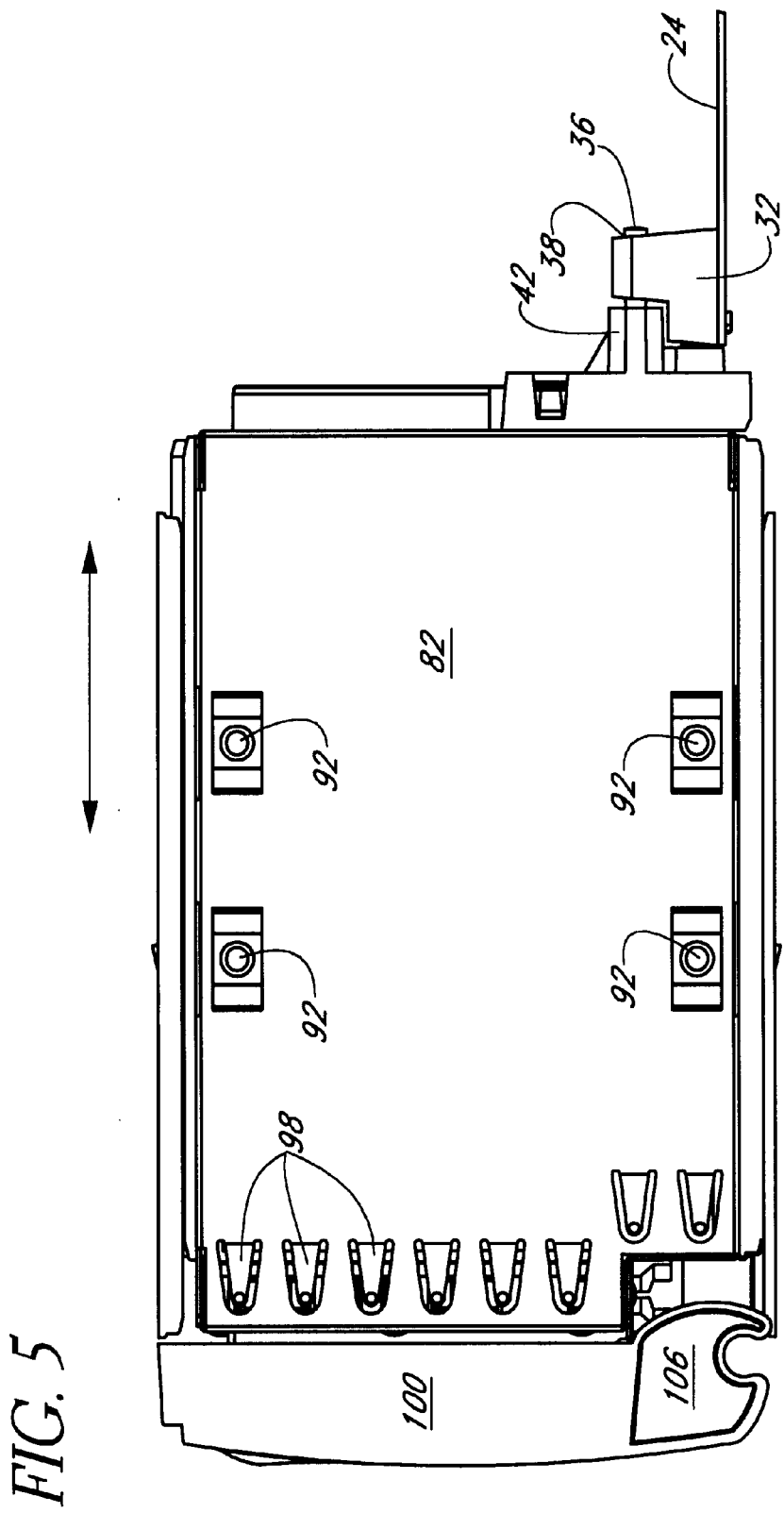
FIG. 5 is a side elevation view of a guide pin block, docking connector and a carrier illustrating a position of a base board relative to said carrier and a direction of insertion of the carrier.
Figure 6:
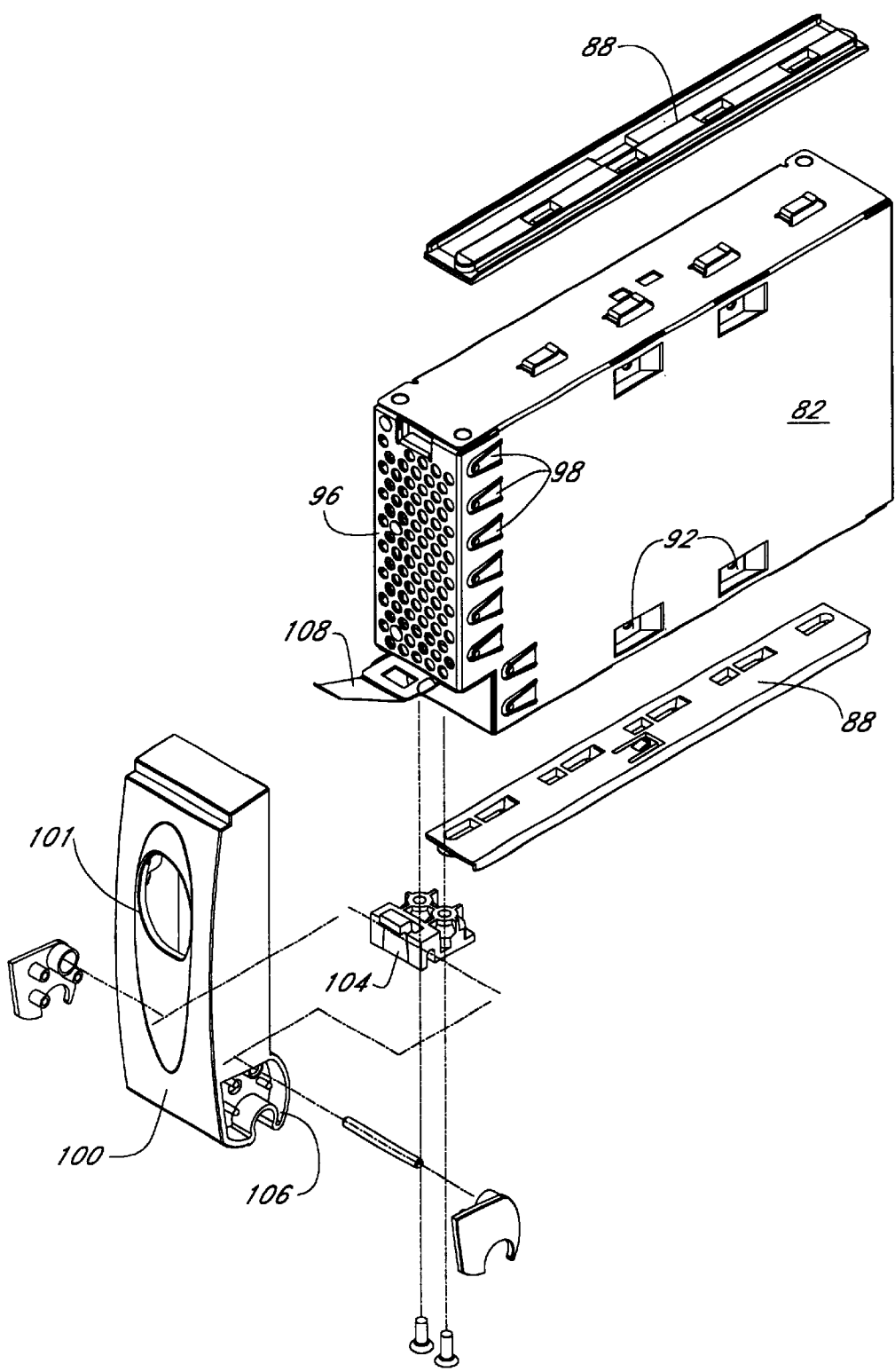
FIG. 6 is a top-front perspective exploded view of the carrier assembly.
Figure 7:
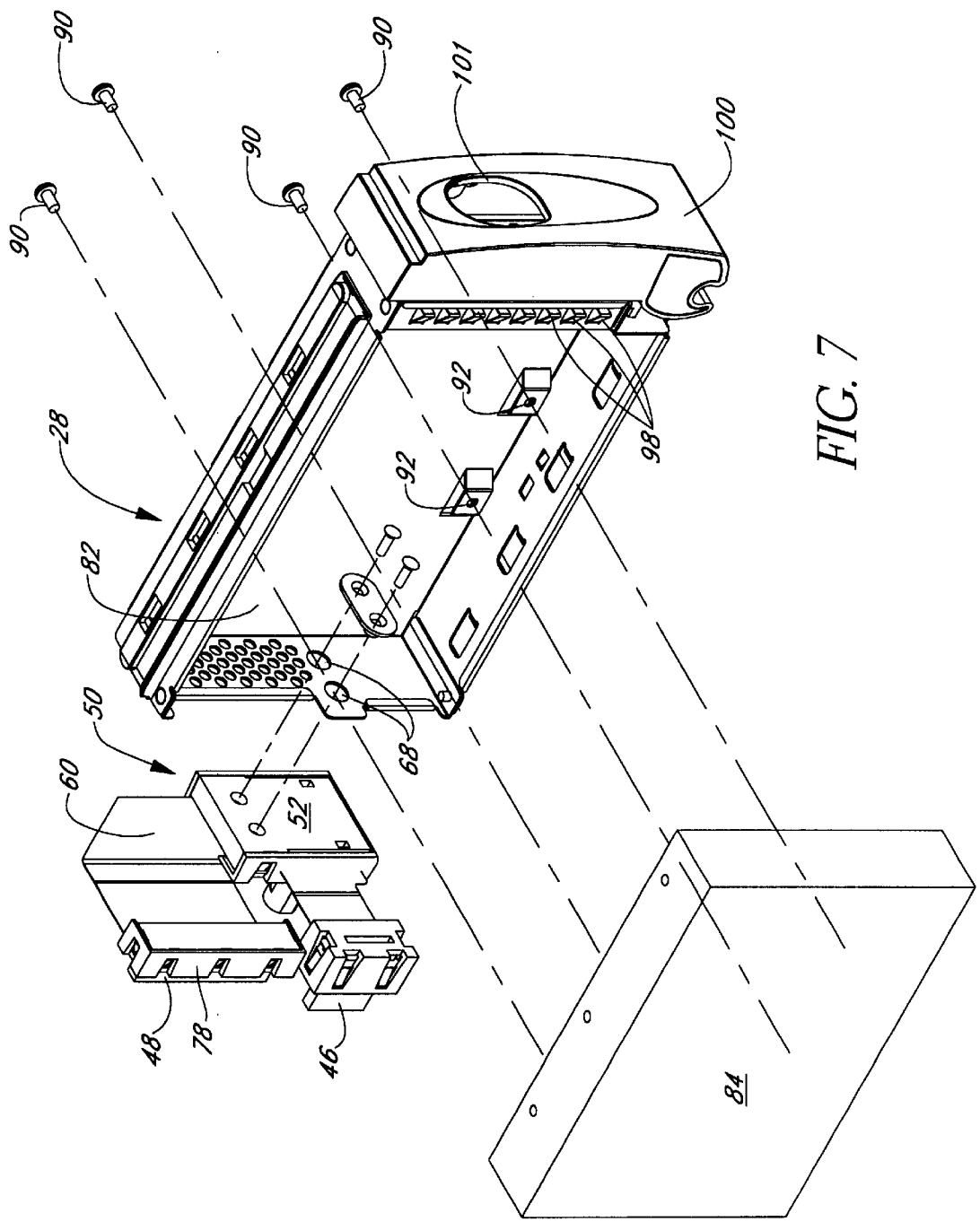
FIG. 7 is another top-front perspective exploded view of the carrier assembly.

With reference to FIG. 4, the flexible circuit assembly also comprises a dock clamp 50. The dock clamp 50 comprises a front 52 and a back 54 in the illustrated arrangement. The two components 52, 54 preferably are injection molded parts that snap over the vertical docking connector 44 on the flexible circuit assembly 30. The back 54 desirably is sized and configured to closely correspond to the vertical docking connector 44 and can include the conical shaped bosses 42 described above. In other words, the back 54 preferably includes an aperture 56 that is sized and configured to receive the docking connector 44 such that the docking connector 44 can be secured against substantial movement relative to the dock clamp 50 after the dock clamp 50 has been assembled.

The back 54 also preferably includes a channel 58 that accommodates a flat cable 60 or portion of the flexible circuit. The cable 60 can be a PC board or can be a flexible plastic component that provides electrical communication between the connectors (input and output) 44, 46, 48. The cable 60 desirably is captured within the channel 58 between the back 54 and the front 52 of the dock clamp 50. Accordingly, the front 52 is sized and configured to closely associate with the back 54 in the illustrated arrangement. The illustrated arrangement advantageously results in added strain relief for the flexible cable 60. Preferably, the connectors all are assembled to the cable 60 on the same side as illustrated in FIG. 4. This same-side assembly reduces assembly costs. As illustrated, once the cable is installed in the carrier assembly 28, the cable can be bent or otherwise manipulated such that the connectors face in appropriate directions. For instance, the connector that attaches to the docking connector extends in a first direction and the other connectors extend in the opposite direction in the illustrated arrangement. In addition, the flexible cable 60 allows systems arranged and configured in accordance with certain aspects of the present invention to be connected to hardware components 84 that have differing connector locations.

The front 52 of the dock clamp 50 preferably comprises a mounting structure 62. In the illustrated arrangement, the mounting structure 62 comprises a pair of mounting bosses 62. The mounting bosses 62 can accommodate fasteners 64 that are used to attach the dock clamp 50 to a carrier 28. In the illustrated arrangement, the mounting structure 62 reinforces the dock clamp 50 proximate the location that receives the fasteners 64. As illustrated, the preferred mounting structure 62 uses two screws 64 and two plastic shoulder washers 66 that are screwed through a set of corresponding holes 68 formed in the carrier 28 into the front 52 of the dock clamp 50.

This mounting arrangement advantageously allows the flexible circuit assembly 30 to float relative to the carrier 28, which will be described in more detail below. Accordingly, as described above, the floating action in combination with the tapered pins 36 and holes 40 facilitates mating alignment even if the components 30, 32 are slightly misaligned due to manufacturing tolerance stack-ups or relaxed levels of manufacturing tolerance allowances. In most applications, the tolerance capacity of the connectors is approximately +/−1 mm in the horizontal direction and approximately +/−0 mm in the vertical direction. Thus, the above-described construction helps mate the connectors in the even or slight misalignments. Moreover, because this arrangement facilitates alignment in all directions normal to the axis of the dowel pins 36, manufacturing tolerances can be somewhat relaxed such that the manufacturing costs can be greatly decreased.

The illustrated flexible circuit assembly also comprises a power connector clamp 70. The power connector clamp 70 comprises a front 72 and a back 74. The front 72 and the back 74 preferably are made of injection molded plastic. Similar to the dock clamp 50, the front 72 and the back 74 desirably snap-fit together. When snapped together over the hard drive power connector 46 in the illustrated arrangement, the power connector clamp 70 provides strain relief as well as gripping surfaces for the assembly-person to hold onto during installation and removal.

In addition, the illustrated flexible circuit assembly comprises a signal connector clamp 76. The signal connector clamp 76 comprises a front 78 and a back 80 that preferably are manufactured by injection molding of plastic. The front 78 and the back 80 desirably snap fit together to substantially encase the hard drive signal connector 48 to provide stain relief and a gripping surface in much the same manner as the power connector clamp 70.

The carrier assembly 28 generally comprises a box 82 into which a hardware component 84 (e.g., an ATA or other hard drive) can be mounted for installation into the cabinet 10. The hardware component 84 can be a hard drive, a 3.5" disk drive, a CD-ROM drive, a DVD drive, a solid state storage drive, or another type of peripheral device. As is generally known to those of ordinary skill in the art, a pair of rails 86 preferably is assembled to the box 82. One of the rails 86 desirably is mounted to one side of the box 82 while a second of the rails 86 desirably is mounted to an opposite side of the box 82. Two corresponding rails 88 preferably are attached to the cabinet 10 or an associated chassis. The rails 86, 88 preferably are injection molded plastic parts that are made from an Acetal material or other lubricious component such that friction between the mating rails 86, 88 can be decreased. Moreover, in particularly advantageous arrangements, the two mating rails 86, 88 are closely aligned to reduce relative movement between the cabinet 10 and the box 82. This close alignment increases the ability of the system to withstand shock and vibration.

The hardware component 84, which can be an ATA hard drive or any other suitable peripheral device, is mounted to the carrier box 82 of the carrier assembly 28 by suitable fastening arrangements. In the illustrated arrangement, four screws 90 extend through apertures 92 in the carrier box 82 and thread into receiving holes 94 on the hardware component 84 that are standard in the industry. The screws 90 preferably extend into the bottom receiving holes 94 on the hard drive 84 because this mounting arrangement eases assembly and reduces movement of the hard drive 84 resulting from shock and vibration experienced by the system in general and the carrier assembly 28 specifically. Moreover, the mounting position of the hardware component within the carrier assembly preferably does not substantially vary regardless of the design of the selected hardware component. In other words, arrangements made in accordance with certain aspects of the present invention preferably can accommodate hardware components having differing connector locations without varying the mounting location of the hardware components within the carrier assembly. This results in a decreased overall dimension to the carrier, the chassis and the unit as a whole. As described above, the flexible circuit assembly can accommodate hardware components having various connector locations, which results in an added degree of flexible that is associated with certain features of the present invention.

The carrier box 82 in the illustrated arrangement features a bottom and three side walls. Accordingly, the front shield is substantially open. In the illustrated arrangement, a front shield 96 is provided. The front shield 96 of the carrier box 82 preferably is perforated or has other structures that accommodate the cooling airflow A. For instance, the front shield 96 also can comprise a number of air flow apertures to increase air flow through the carrier across the mounted drive or other hardware component 84. This arrangement advantageously directs the cooling airflow across the mounted hardware component 84.

The front shield 96 also preferably comprises a number of spring fingers 98 on each side that contact inner or outer surfaces (not shown) of the cabinet 10 or an associated chassis. In the illustrated arrangement, the spring fingers 98 frictionally engage the inner surface of the chassis to better secure the box 84 within the cabinet 10. This arrangement advantageously provides electromagnetic interference containment and electrostatic discharge protection by further improving the grounding connection between the mounted hardware component 84 and the chassis or the cabinet 10.

The illustrated front shield 96 also includes a top opening 99. The top opening 99 preferably is formed by splitting a portion of the front shield 96 and bending two separated portions outward. This forms a pair of tabs that define the top opening 99 of the front shield 96. In addition, the front shield 96 can be attached to the carrier assembly in any suitable manner. For instance, the front shield 96 can be riveted, fastened, welded, brazed or otherwise secured to the carrier assembly 28.

A carrier face 100 is provided that provides an aesthetically-pleasing appearance to the carrier assembly 28 when combined with the cabinet 10. Preferably, the carrier face 100 is manufactured by injection molding plastic. The carrier face 100 includes a hole 101 (FIG. 1) of any desired shape and dimension. Preferably, the hole 101 accommodates an adequate flow of air through the carrier assembly 28 and the chassis. The hole 101 also preferably serves as a finger access to a release hook 102 provided within the carrier face 100 and to allow the carrier face 100 to act as a handle that actuates a cam lock-down and release feature, which will be described.

As will be understood, the hook 102 is sized and configured to extend rearward through the opening 99 formed in the front shield 96. Moreover, a portion of the hook 102 catches on an inner surface of the front shield 96 adjacent the opening 99. Thus, with the hook 102 engaged on the inner surface of the illustrated front shield 96, or any other suitable surface that is connected to the carrier assembly 28, the cabinet 10 or the chassis, the carrier face 100 can be secured in a closed position.

The carrier face 100 preferably is pivotally attached to the carrier assembly 28. In the illustrated arrangement, the carrier face 100 and the carrier assembly 28 are connected with a dowel pin (not shown) and a carrier pivot 104. The carrier pivot 104 can be attached to the carrier assembly 28 in any suitable manner. In the illustrated arrangement, the carrier pivot is attached using threaded fasteners. Of course, other mounting arrangements, such as rivets, welds, snaps, pins, clips, hooks and the like.

The carrier face 100 also includes a cam surface 106 on a rearward-facing surface. In the illustrated arrangement, a pair of cam surfaces 106 is used and the carrier box 82 is notched to provide operating clearance for the cam surfaces 106. The cam surface 106 works in conjunction with the chassis or a surface 107 of the cabinet 10 to aid in smooth insertion and extraction of the carrier assembly 28. The combination reduces the likelihood that the carrier assembly 28 (and any component disposed with the carrier or attached to the carrier) will be substantially jarred or shocked during insertion or removal. As the carrier assembly 28 is inserted into the drive cage defined within the cabinet 10, the final travel of the carrier assembly 28 is accomplished by pivoting the carrier face 100 to "pull" the carrier assembly 28 further into the drive cage using the cam surfaces 106. By using the face to pull the carrier assembly the final engagement distance, the mating connectors on the base board and on the disk drive assembly engage in a controlled and calculated manner. Likewise, to remove a carrier assembly 28, the carrier face 100 is pivoted so that the cam surfaces 106 "push" the carrier assembly 28 outward for a short distance. This prevent careless assembly or maintenance workers from damaging the hardware components 84 or the docking connectors by pushing the carrier assembly 28 in too fast, or by removing the carrier assembly too rapidly. For instance, pulling a disk drive out too fast while the disk is spinning could result in damage to the read/write heads or to the magnetic media.

A carrier face biasing member 108 advantageously is disposed to hold the carrier face 100 in a first position prior to insertion of the carrier assembly 28 into the cabinet 10. In the illustrated arrangement, the biasing member 108 is a leaf spring. Of course, it is contemplated that any of a number of types of biasing members, such as compression springs, torsion springs, flexible membranes, and the like, can be used. The carrier face 100 moves to a second position following insertion of the carrier assembly 28 into the cabinet 28. With the carrier assembly 28 installed within the cabinet 10, the illustrated carrier face 100 can be moved, or is urged by a corresponding structure on the cabinet 10, to a closed position. In a closed position, the carrier face 100 is generally flush with the cabinet opening into which the carrier assembly 28 is inserted. With the carrier face 100 in the closed position, the integral hook 102 locks the carrier face 100 in its closed position and the cam surfaces 106 secure the carrier assembly 28 in the cabinet 28 by latching over the dowel pin secured in the carrier pivot 104. Importantly, in some applications, as the carrier face 100 is opened from the closed position, the carrier hook 100 presses against a counteracting surface and releases the dowel pin to urge the carrier assembly 28 outward from the cabinet 28 for extraction from the cabinet 28 and chassis.

Although the present invention has been described in terms of a certain embodiment, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention.

What is claimed is:

1. A computer system comprising a circuit board and a first connector mounted to said circuit board, a drive secured to a carrier and having a drive connector disposed on a surface, said circuit board extending in a direction generally normal to said surface, said carrier comprising an electrical conduit, said electrical conduit comprising a mating connector and a blind-plug, said mating connector being adapted to connect to said drive connector and said blind-plug being adapted to couple to said first connector.

2. The system of claim 1, wherein said drive comprises a logic connector and a power connector.

3. The system of claim 1, wherein said blind-plug is capable of movement relative to said carrier.

4. The system of claim 3 further comprising an alignment mechanism being secured to said circuit board.

5. The system of claim 4, wherein said alignment mechanism substantially encases said first connector.

6. The system of claim 4, wherein said alignment mechanism comprises an alignment pin.

7. The system of claim 6, wherein said alignment mechanism comprises an additional alignment pin.

8. The system of claim 6, wherein said alignment pin is tapered with a smaller end extending away from an end secured to said circuit board.

9. An electronic system comprising an enclosure, a base board positioned within said enclosure, said base board comprising a docking connector fixed to a surface of said base board, a drive carrier being adapted for insertion into said enclosure along a first axis, a drive being disposed within said drive carrier, said drive having a connector disposed along a first surface, said first axis extending in a direction generally parallel to said base board and an electrical conduit extending between said connector of said drive and said docking connector of said base board.

10. The system of claim 9 wherein said surface of said base board to which said docking connector is fixed extends parallel to said first axis.

11. The system of claim 9 further comprising an alignment mechanism disposed along said base board.

12. The system of claim 9 further comprising a second drive carrier being adapted or insertion into said enclosure along a second axis that is parallel to said first axis, said base board comprising a second docking connector to which an electrical conduit of said second drive carrier can be connected.

13. The system of claim 11, wherein said alignment mechanism comprises at least one alignment pin.

14. The system of claim 13, wherein said at least one alignment pin tapers.

15. The system of claim 13, wherein said at least one pin is adapted to mate with an aperture connected to said drive carrier.

16. The system of claim 15, wherein said aperture can move relative to said drive carrier.

17. A pluggable drive carrier comprising a carrier body adapted to receive a drive and having an outside surface, a blind plug connector mounted to said outside surface, an electrical conduit being electrically coupled to said blind plug connector, a second connector being secured to said electrical conduit and said second connector being capable of being disposed within said carrier body.

18. The carrier of claim 17, wherein said second connector comprises a logic connector and a power connector.

19. The carrier of claim 17, wherein said electrical conduit is a flexible circuit and said second connector and said blind plug connector extend outward from a single side of said flexible circuit.

20. The carrier of claim 17, wherein said blind plug connector is capable of movement relative to said carrier.

* * * * *